United States Patent
Klicpera

(10) Patent No.: US 8,482,248 B2
(45) Date of Patent: Jul. 9, 2013

(54) METHOD AND APPARATUS FOR CHARGING HANDHELD DATA CAPTURE DEVICE WITH CRADLE

(75) Inventor: Christopher P. Klicpera, Westbury, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 276 days.

(21) Appl. No.: 12/869,392

(22) Filed: Aug. 26, 2010

(65) Prior Publication Data

US 2012/0049784 A1    Mar. 1, 2012

(51) Int. Cl.
*H02J 7/00*    (2006.01)

(52) U.S. Cl.
USPC .......................................... 320/103; 320/115

(58) Field of Classification Search
USPC ....................................................... 320/103
See application file for complete search history.

(56) References Cited

U.S. PATENT DOCUMENTS

| 4,794,239 | A | | 12/1988 | Allais | |
|---|---|---|---|---|---|
| 5,304,786 | A | | 4/1994 | Pavlidis et al. | |
| 5,762,512 | A | * | 6/1998 | Trant et al. | 439/347 |
| 2005/0189913 | A1 | * | 9/2005 | Vitanov et al. | 320/114 |
| 2008/0061733 | A1 | * | 3/2008 | Toya | 320/103 |

* cited by examiner

*Primary Examiner* — Arun Williams
(74) *Attorney, Agent, or Firm* — Nong-Qiang Fan

(57) ABSTRACT

A method and apparatus for powering a handheld data capture device. The apparatus includes a cradle configured to accommodate a handheld data capture device detachably settled therein. The apparatus also includes an energy reservoir installed in the cradle, a charging interface, and a port operative to charge at least the energy reservoir with a current-limited host. The charging interface on the cradle is operative to charge the handheld data capture device with at least the energy reservoir.

17 Claims, 4 Drawing Sheets

METHOD AND APPARATUS FOR CHARGING HANDHELD DATA CAPTURE DEVICE WITH CRADLE

FIELD OF THE DISCLOSURE

The present disclosure relates generally to handheld data capture devices including handheld barcode readers or handheld RFID readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417, which are respectively described in U.S. Pat. No. 4,794,239 and U.S. Pat. No. 5,304,786.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

FIG. 1A shows an imaging scanner 50 in accordance with some implementations. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes.

In FIG. 1A, a cable 59 is also connected to the base 52. The cable 59 can be implemented to provide the power to the imaging scanner 50. In other implementations, as shown in FIG. 1B, the imaging scanner 50 can be detachably placed in a cradle 100. When the imaging scanner 50 is removed from the cradle 100, it functions as a cordless handheld device that can freely move around. When the imaging scanner 50 is detachably settled in the cradle 100, the imaging scanner 50 can be charged with a cable 59 connected to the cradle 100. For variety of reasons, an USB (Universal Serial Bus) cable is quite often used as the cable 59 connected to the cradle 100. But, in some implementations, the charging current requirement of the imaging scanner 50 can exceed the current limit imposed by the USB standard. For example, USB 2.0 allows a maximum load current of 500 mA, and USB 3.0 allows a maximum load current of 900 mA. In general, even if the cable 59 is not a USB cable, the cable 59 is quite often connected to a current-limited host, and the charging current requirement of the imaging scanner 50 can exceed the current limit that can be provided by such current-limited host. Therefore, it may be desirable to find a better technique for charging the imaging scanner with a cradle that is connected to current-limited host.

SUMMARY

In one aspect, the invention is directed to a method of charging a handheld data capture device with a cradle. The method includes charging the handheld data capture device with at least an energy reservoir installed in the cradle when the handheld data capture device is detachably settled in the cradle. The handheld data capture device can include a barcode reading arrangement for reading a barcode on a target object or an RFID reader. The method also includes charging at least the energy reservoir with a current-limited host. In one implementation, the current-limited host can be an USB host. In some implementation, the method can include charging the handheld data capture device with both the energy reservoir installed in the cradle and the current-limited host when the handheld data capture device is detachably settled in the cradle.

In another aspect, the invention is directed to an apparatus. The apparatus includes a cradle configured to accommodate a handheld data capture device detachably settled therein. The apparatus also includes an energy reservoir installed in the cradle, a charging interface, and a port operative to charge at least the energy reservoir with a current-limited host. The charging interface on the cradle is operative to charge the handheld data capture device with at least the energy reservoir.

Implementations of the invention can include one or more of the following advantages. Even if the cradle is powered from a current-limited host, such as an USB port, the handheld data capture device can still be charged with a current that exceeds the maximal current output from the current-limited host. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
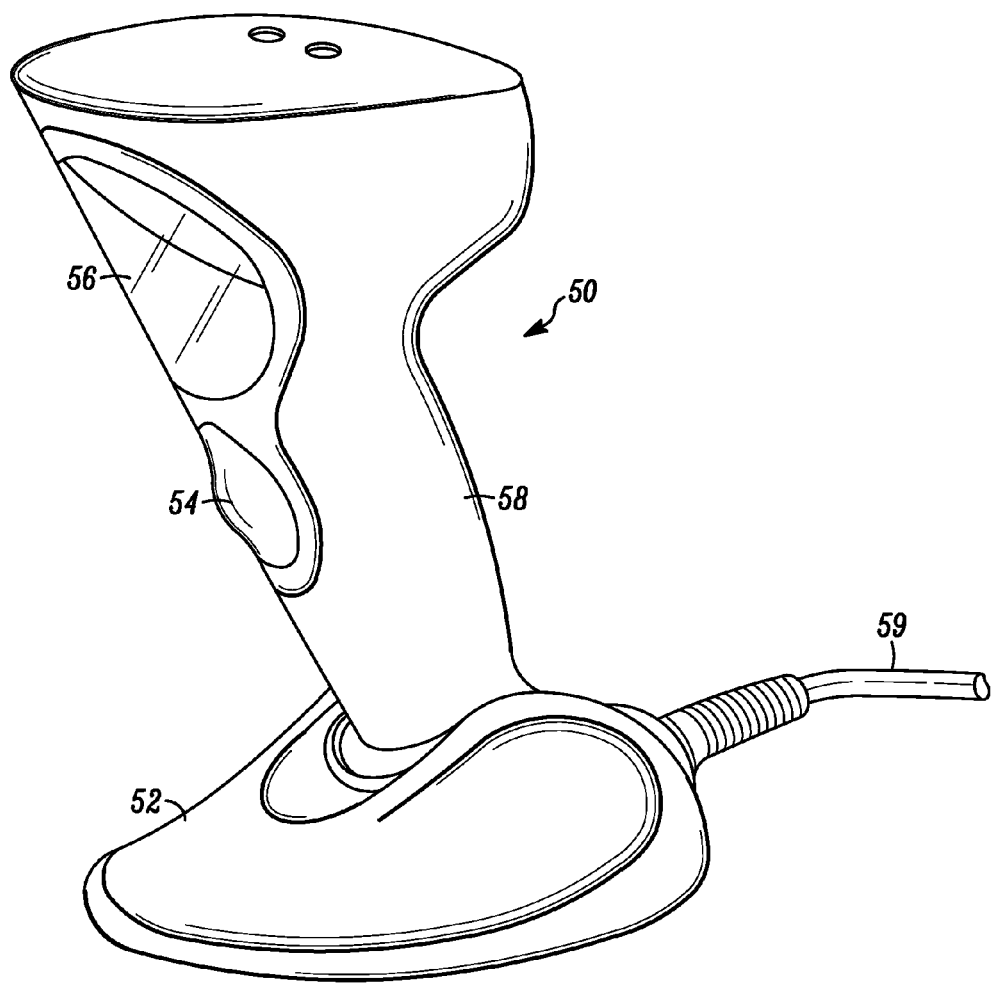
FIG. 1A shows an imaging scanner in accordance with some embodiments.
Figure 1B:
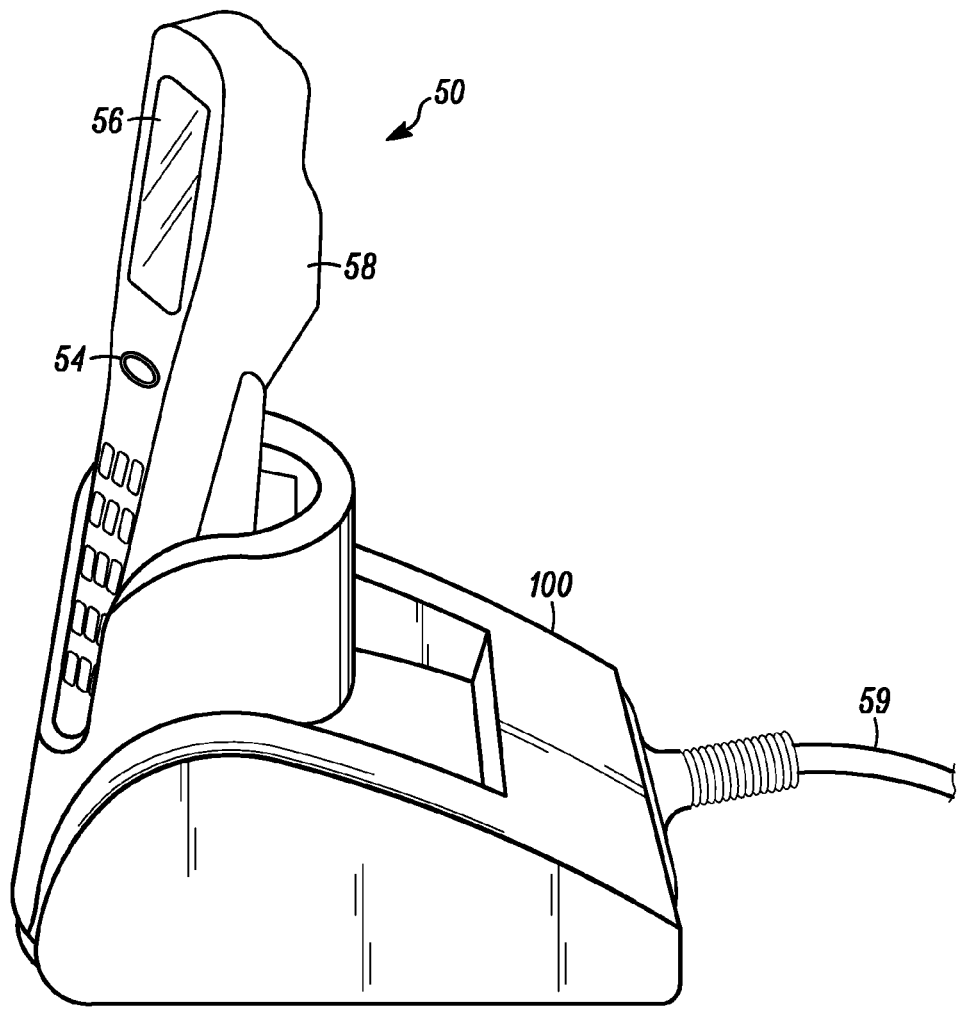
FIG. 1B shows an imaging scanner that is detachably placed in a cradle in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
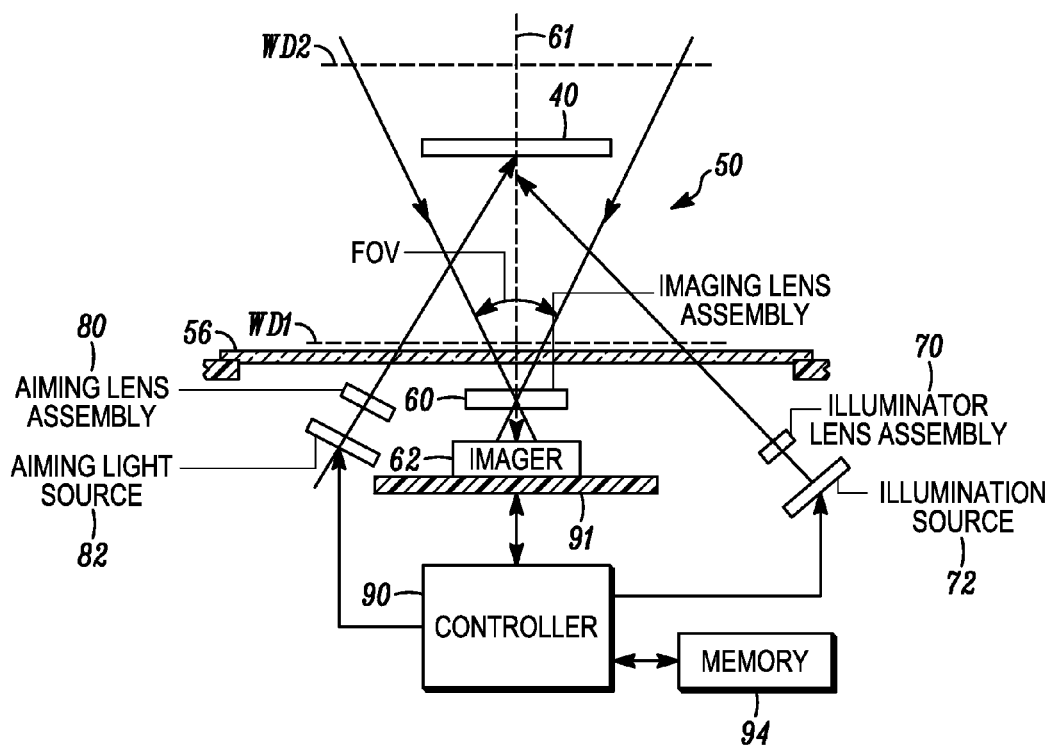
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
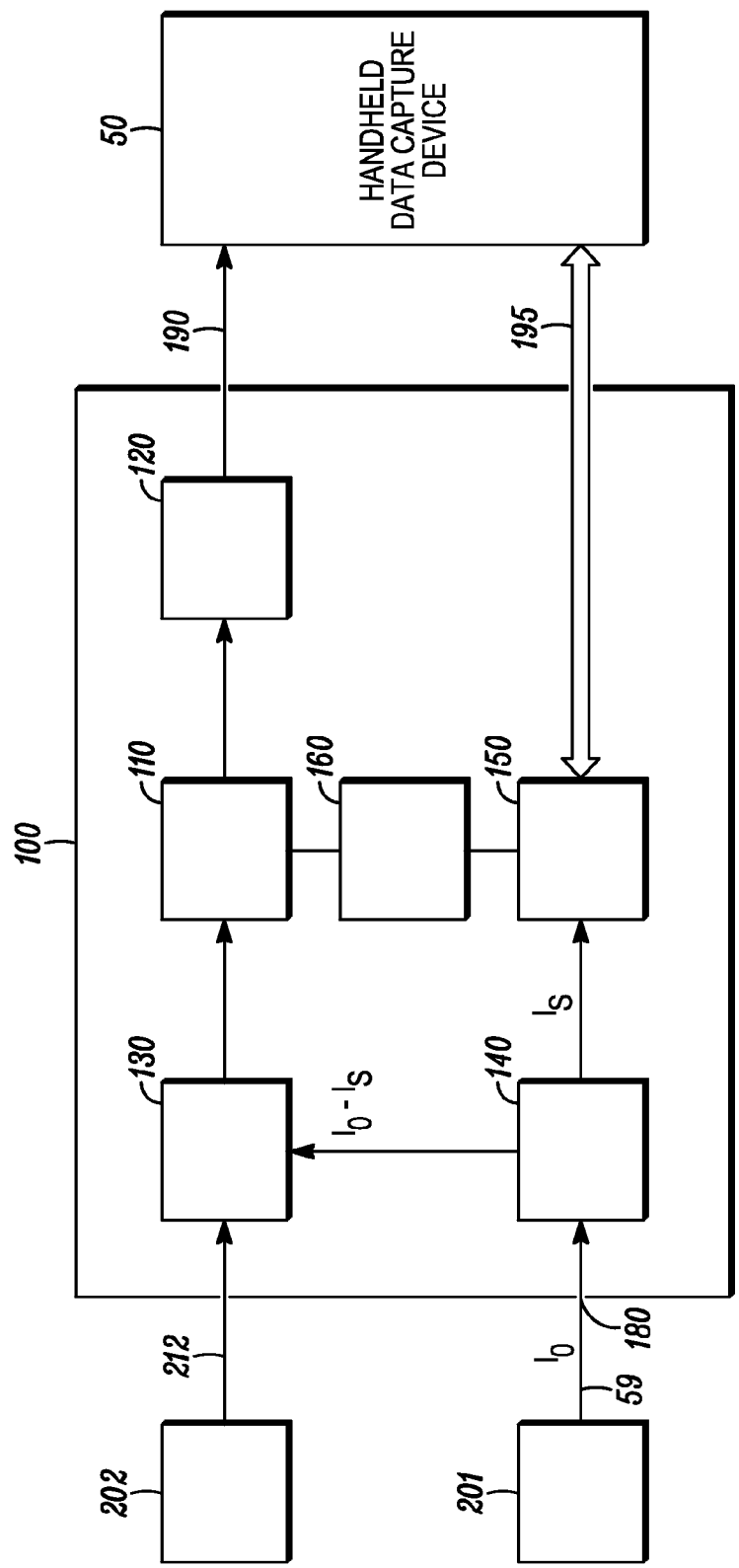
FIG. 3 is a schematic of a cradle for charging a handheld data capture device in accordance with some embodiments.

FIG. 3 is a schematic of a cradle 100 for charging a handheld data capture device 50 in accordance with some embodiments. Generally, the handheld data capture device 50 can includes a barcode reading arrangement or an RFID reader. In FIG. 3, the cradle 100 includes an energy reservoir 110, a charging interface 190, and a port 180 that can be connected to a current-limited host 201 through a cable 59. In most implementations, the energy reservoir 110 is a battery, but in some implementations, the energy reservoir 110 can be an energy storage capacitor or capacitor array with a very large capacity value capable of storing at least 1000 Coulombs of charge. The charging interface 190 can be used to charge the handheld data capture device 50. The port 180 can be used to charge at least the energy reservoir 110 with the current-limited host 201. In many implementations, the current-limited host 201 is a USB host. In these implementations, the port 180 can be in the form of an USB connector or an USB cable. In some other implementations, the current-limited host 201 can also be other kinds of host that has a limit on the maximal output current.

In the implementation as shown in FIG. 3, the cradle 100 also includes a regulator 120, a reservoir charger 130, an input current controller 140, a microcontroller 150, a reservoir gauge 160, and a charging condition interface 195. In operation, the total current $I_0$ received at the port 180 can be used to charge the energy reservoir 110 and the other electrical components in the cradle 100. In one implementation, the input current controller 140 is used to divide the total current $I_0$ received at the port 180 in to the system current $I_s$ and the reservoir charging current $I_0$-$I_s$. The system current $I_s$ can be use to power the microcontroller 150 and other electrical components in the cradle 100. The reservoir charging current $I_0$-$I_s$ can be used to charge the energy reservoir 110 through the reservoir charger 130.

In the implementation as shown in FIG. 3, the energy reservoir 110 is connected to the charging interface 190 through the regulator 120. In operation, when the handheld data capture device 50 is detachably settled in the cradle 100, the handheld data capture device 50 can be charged by the energy reservoir 110 through the regulator 120. The regulator 120 may change the voltage level outputted from the energy reservoir 110 to a voltage level that is compatible to the input voltage requirement of the handheld data capture device 50.

In some operation conditions, when the handheld data capture device 50 is being charged by the energy reservoir 110 through the regulator 120, the energy reservoir 110 itself can be charged at the same time with the current-limited host 201 connected to the cradle 100 though the cable 59. Under such operation condition, the cradle 100 can be designed in such a way that the handheld data capture device 50 is practically charged with both the current-limited host 201 and the energy reservoir 110. Under such operation condition, the charging current for charging the handheld data capture device 50 can exceed the maximal current that can be provided by the current-limited host 201. For example, when a USB 2.0 host is used as the current-limited host 201, the cradle 100 in FIG. 3 can be designed to charge the handheld data capture device 50 with a charging current exceeding 500 mA. In the implementation as shown in FIG. 3, the energy reservoir 110 can also be optionally charged with a power supply 202 when it is connected to the cradle 100 through a cable 212.

In some operation conditions, when the current-limited host 201 or the power supply 202 is not connected to the cradle 100 though the cable 59, the handheld data capture device 50 can still be charged by the energy reservoir 110 through the regulator 120.

In the implementation as shown in FIG. 3, the charging condition interface 195 can communicate to the handheld data capture device 50 some information related to the charging conditions of the cradle 100, such as, the voltage level of the energy reservoir 110 or the maximum current the cradle 100 can output with the charging interface 190. In some implementations, the cradle 100 will send the charging condition information to the handheld data capture device 50 on its own initiative. In some implementations, the cradle 100 will send the charging condition information to the handheld data capture device 50 when the cradle 100 is queried by the handheld data capture device 50. In FIG. 3, the charging condition information is provided by the microcontroller 150. The reservoir gauge 160 that is connected to the energy reservoir 110 to monitor its operating condition, and the microcontroller 150 can get the operating condition about the energy reservoir 110 from the reservoir gauge 160.

In operation, the charging condition information provided by the cradle 100 to the handheld data capture device 50 can be used by the handheld data capture device 50 to adjust its input current requirement accordingly. For example, in a scenario that a USB 2.0 host is used as the current-limited host 201, if the charging condition information indicates that the energy reservoir 110 is fully charged, the handheld data capture device 50 then can take a charging current from the cradle 100 that exceeds 500 mA. On the other hand, if the charging condition information indicates that the energy reservoir 110 is almost completely depleted, the handheld data capture device 50 then has to take a charging current from the cradle 100 that is somewhat less than 500 mA.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of charging a handheld data capture device with a cradle comprising:
   communicating from the cradle to the handheld data capture device an allowable charge current value; and
   charging the handheld data capture device with a current provided by both an energy reservoir installed in the cradle and a current-limited DC-power host when the handheld data capture device is detachably settled in the cradle, wherein the current charging the handheld data capture device is smaller than the allowable charge current value and is higher than a maximum DC current deliverable from the current-limited DC-power host, wherein the handheld data capture device includes at least one of a barcode reading arrangement and an RFID reader.

2. The method of claim 1, wherein the current-limited DC-power host is a USB host.

3. The method of claim 1, further comprising:
   determining an allowable reservoir-output current from the energy reservoir; and determining the allowable charge current value based on the determined allowable reservoir-output current.

4. The method of claim 1, further comprising:
   charging at least the energy reservoir with the current-limited DC-power host when the handheld data capture device is removed from the cradle.

5. The method of claim 1, further comprising:
   charging at least the energy reservoir with a power supply connected to a supplementary power port on the cradle.

6. The method of claim 1, further comprising:
   charging both the energy reservoir and the handheld data capture device with a power supply connected to a supplementary power port on the cradle.

7. The method of claim 1, wherein the energy reservoir is a battery.

8. The method of claim 1, wherein the energy reservoir is an energy storage capacitor or capacitor array capable of storing at least 1000 Coulombs of usable charge.

9. The method of claim 1, wherein the barcode reading arrangement comprises:
   a solid-state imager having an array of photosensitive elements for capturing an image from a target object having a barcode;
   a lens system operative to focus light reflected from the target object onto the array of photosensitive elements in the solid-state imager; and
   an electric circuitry operative to transfer the image captured by the solid-state imager to a barcode decoding circuitry.

10. A cradle for charging a handheld data capture device comprising:
    means for communicating from the cradle to the handheld data capture device an allowable charge current value; and
    means for charging the handheld data capture device with a current provided by both an energy reservoir installed in the cradle and a current-limited DC-power host when the handheld data capture device is detachably settled in the cradle, wherein the current charging the handheld data capture device is smaller than the allowable charge current value and is higher than a maximum DC current deliverable from the current-limited DC-power host, wherein the handheld data capture device includes at least one of a barcode reading arrangement and an RFID reader.

11. An apparatus comprising:
    a cradle configured to accommodate a handheld data capture device detachably settled therein, the handheld data capture device including at least one of a barcode reading arrangement and an RFID reader;
    an energy reservoir installed in the cradle;
    a port operative to charge at least the energy reservoir with a current-limited DC-power host;
    a charging condition interface operative to communicate to the handheld data capture device an allowable charge current value; and
    a charging interface on the cradle operative to charge the handheld data capture device with a current provided by both the energy reservoir and the current-limited DC-power host, wherein the current charging the handheld data capture device is smaller than the allowable charge current value and is higher than a maximum DC current deliverable from the current-limited DC-power host.

12. The apparatus of claim 11, wherein the energy reservoir is a battery.

13. The apparatus of claim 11, wherein the energy reservoir is an energy storage capacitor or capacitor array capable of storing at least 1000 Coulombs of usable charge.

14. The apparatus of claim 11, wherein the apparatus further comprises:
    a battery gauge operatively couple to the energy reservoir; and
    a controller operatively couple to the battery gauge to determine the allowable reservoir-output current from the energy reservoir.

15. The apparatus of claim 11, wherein the apparatus further comprises:
    a supplementary power port operative to charge at least the energy reservoir with a power supply connected to the supplementary power port.

16. The apparatus of claim 11, wherein the apparatus further comprises:
    a supplementary power port operative to charge the handheld data capture device with a power supply connected to the supplementary power port.

17. The apparatus of claim 11, wherein the barcode reading arrangement comprises:
    a solid-state imager having an array of photosensitive elements for capturing an image from a target object having a barcode;
    a lens system operative to focus light reflected from the target object onto the array of photosensitive elements in the solid-state imager; and
    an electric circuitry operative to transfer the image captured by the solid-state imager to a barcode decoding circuitry.

* * * * *